United States Patent [19]
Guimier

[11] Patent Number: 6,094,227
[45] Date of Patent: Jul. 25, 2000

[54] DIGITAL IMAGE RATE CONVERTING METHOD AND DEVICE

[75] Inventor: Stéphane-Pascal Guimier, Yvre l'Eveque, France

[73] Assignee: U.S. Philips Corporation, New York, N.Y.

[21] Appl. No.: 09/014,173

[22] Filed: Jan. 27, 1998

[30] Foreign Application Priority Data

Feb. 3, 1997 [FR] France ................................... 97 01169

[51] Int. Cl.$^7$ .............................. H04N 7/01; H04N 11/22
[52] U.S. Cl. ............................................ 348/459; 348/443
[58] Field of Search ..................................... 348/441, 443, 348/459, 792, 793, 17, 18; 345/89, 94; H04N 7/01, 11/20, 11/22

[56] References Cited

U.S. PATENT DOCUMENTS

| | | | |
|---|---|---|---|
| 4,593,316 | 6/1986 | Kellar et al. | 348/441 |
| 5,596,349 | 1/1997 | Kobayashi et al. | 345/147 |

FOREIGN PATENT DOCUMENTS

| | | | |
|---|---|---|---|
| 0701368A2 | 3/1996 | European Pat. Off. | H04N 7/01 |
| 08016128 | 1/1996 | Japan | G09G 3/20 |

*Primary Examiner*—Michael H. Lee
*Attorney, Agent, or Firm*—Jack D. Slobod

[57] ABSTRACT

A digital signal converting method and device for converting an input image rate into an output image rate, is applied to input images which are formed by a plurality of input data frames. The method storing the input frames, calculating a sliding average over a plurality of stored frames, and deriving the averages for producing output images with a timing fixed by the output image rate.

8 Claims, 4 Drawing Sheets

DIGITAL IMAGE RATE CONVERTING METHOD AND DEVICE

FIELD OF THE INVENTION

The invention relates to a digital signal converting method and device for converting an input image rate into an output image rate, the input images being formed by input data frames.

BACKGROUND OF THE INVENTION

Such a method and device have interesting applications in the domain of animated image transmission, notably for displaying on a television screen images coming from a device with a liquid crystal display screen. Other applications of the invention may be considered a possibility such as videophone, telemonitoring systems or digital television.

Liquid crystal display screens or LCDs available in commercial electronic devices are generally intended to display alphanumeric information or fixed images, but are not adapted to kinematic images. Indeed, the image rate on an LCD, of the order of 3 to 6 images per second, is too low to provide a good visual restoration of the mobile images and an annoying jerky effect appears. For obtaining a good quality of animated images, the display rate is to be higher than or equal to 25 images per second. On the other hand, the small size of the usual LCDs does not allow of obtaining a sufficient image precision for an application to animated images.

Therefore, it is interesting to be able to increase the image rate originally intended to be from 3 to 6 images per second for an LCD, so as to comfortably display the images with the aid of a display monitor (notably a television set) fed with at least 25 images per second.

It is thus an object of the invention to provide a means for increasing the rate of images intended to be displayed on an LCD in order to make this rate compatible with the video rate.

SUMMARY OF THE INVENTION

A method of the type described above is known from the document EP 0701368A2. Although oriented to a different application from that envisaged in the present patent application, this document discloses the principle according to which the rate of digital images produced by an electronic display device may be artificially increased by combining the input data of the device. The described method is based on the principle of repeating the images formed by input data to obtain on the output a higher image rate than that produced by the succession of unique specimens of each image.

For our application, this method has a certain number of drawbacks. Indeed, the low rate produced by the LCD system implies that the successive animated images are sufficiently spaced apart in time and are thus obviously different. The repetition of these images to increase the number thereof (thus the rate) remains effective for displaying fixed images, but not for animated images which are, in addition, widely spaced apart in time. Indeed, the succession of images which are thus formed leads to a visual impression of movement discontinuity which the present invention proposes to render less perceptible.

Therefore, a method of the type mentioned in the opening paragraph is characterized in that it comprises:

a storage step for storing input data frames, a calculation step for calculating a sliding average over a plurality of stored frames, a step for deriving said averages to produce the output images with a timing fixed by the output image rate.

There is also provided a device as mentioned in the opening paragraph, characterized in that it comprises:

storage means for storing input data frames, a calculation cell including a means for producing a sliding average over a plurality of stored frames, a means for deriving said averages and for producing the output images with a timing fixed by the output image rate.

According to a characteristic feature of the invention, a method of the type mentioned above is characterized in that the calculation step for calculating the average is preceded by a decision step for triggering the calculation of an arithmetical average over a plurality of stored frames.

According to this characteristic feature, a device of the type mentioned above is characterized in that the calculation cell comprises:

a calculation means for calculating an arithmetical average over a plurality of frames, a control device for triggering the calculation of the arithmetical average.

Thus, periodically or at arbitrary instants, the arithmetical average is calculated over N frames in lieu of the systematic calculation of the sliding average, where N is preferably the number of frames necessary for forming a digital image. As the calculation of the arithmetical average does not need the result of previous calculations, a new image is obtained without any error propagated by the calculation of previous sliding averages.

BRIEF DESCRIPTION OF THE DRAWINGS

These and other aspects of the invention will be apparent from and elucidated with reference to the embodiments described hereafter.

In the drawings.

DESCRIPTION OF PREFERRED EMBODIMENT

Figure 1:
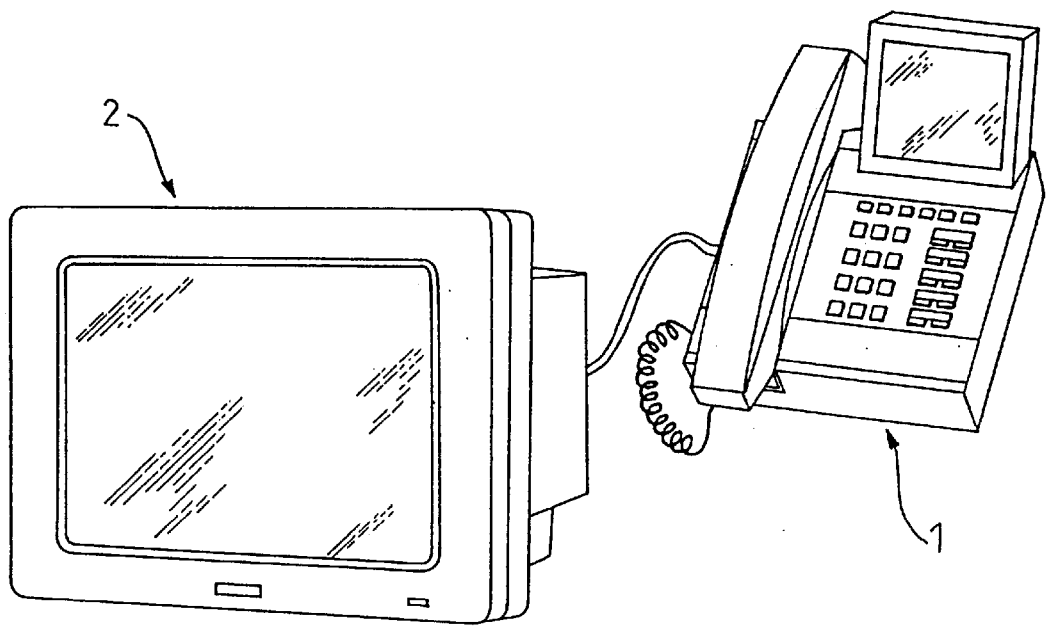
FIG. 1 represents an example of an application of the invention.

The device represented in FIG. 1 is formed by a telephone 1 comprising an LCD display system connected to a monitor 2 (here a television set) for displaying on the monitor 2 images originally intended for the LCD.

A video images is formed by two interleaved frames. As the scanning frequency of a television set is generally around 50 Hz, the video image rate is thus 25 images per second. On the other hand, an image on an LCD is displayed after 16 successive scannings of the 76800 (320*240) pixels of the screen. An image displayed on an LCD is thus formed by 16 non-interleaved frames. The sweep frequency of an LCD varying between 50 and 100 Hz, its rate may vary between 3 and 6 images per second. This low rate explains why the LCDs are only suitable for fixed images.

Figure 2:
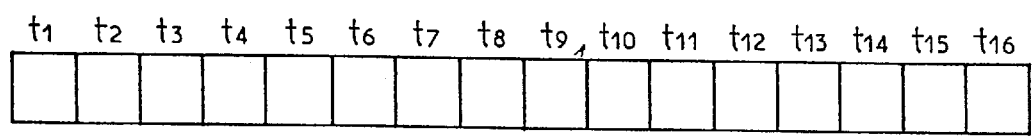
FIG. 2 represents the format of a digital image for a liquid crystal display screen.

FIG. 2 represents the format of a digital image for an LCD. It comprises 16 frames denoted $t_1$ to $t_{16}$, which corresponds to 16 successive sweeps of the screen. Each frame contains data relating to the state of all the pixels of the screen at a given instant. Each pixel of the LCD may thus be excited with each sweep, that is to say, from 0 to 16 times to form an image. The binary nature of the pixels makes it necessary to calculate an average over a large number of frames before the result is displayed on the screen if one wishes to adhere to an acceptable degree of detail for a monochrome image. The 16 frames allow to obtain a visual impression of 16 gray levels, whereas each pixel can only have two states, excited or inactive, which corresponds to only two shades. Whereas the images are interspaced with a period of time necessary for 16 consecutive sweeps, the "average" state of a pixel that lasts 16 sweeps (representing a point of the visual image) may vary much from one image to the next.

Therefore, the known method which consists of repeating the same image a certain number of times to increase the output rate is unadapted to the format of the images intended for the LCDs. Indeed, "jumps" of images will be observed which lead to a visual discontinuity in the movement, which is annoying to the user.

The digital signal converting method according to the invention for increasing the image rate notably intended for an LCD will now be described in more detail.

The data frames representing the state of each pixel at a given instant are produced at a frequency comprised between 50 and 100 Hz. As regards the rate, this is only 3 to 6 images per second. This shift comes from the fact that it is to wait for 16 data frames before it is capable of displaying a complete image on the LCD screen.

The principle of the invention consists of utilizing the data of the frames as soon as they are received to produce new digital images intended for increasing the output image rate. For this purpose, a calculation method is used which is currently used in numerous domains where digital values are smoothed. The calculation of sliding averages is applied to the image processing here. The sliding average is calculated of the states of the pixels over the 16 frames received last, the result of each calculation of an average producing a new image. This calculation may be made with each newly received frame or also all the 2, 3, . . . 15 frames depending on the desired output image rate.

According to a preferred embodiment of the invention, a new image is produced every other frame. The calculation of the average of the states of the pixels over the 16 last frames produces a complete image and by renewing the operation after 2 new frames have been received, other separate images are obtained. The input image rate is proportional to the input data frame rate with a proportionality factor equal to $\frac{1}{16}$. Thus, on the input an eight times higher rate is obtained than the original rate of the input images (or two times lower than the frame rate), that is to say, a rate of 24 to 48 images per second.

The maximum rate of 96 images per second which can be obtained with this method is realized if one image is produced for each received frame, but then a calculation power is necessary which is much higher than that necessary for obtaining a rate of 48 images per second. For the application to the video intended above, an output rate of 48 images per second is largely sufficient for adhering to the television standard which prescribes only 25.

Figures 3A, 3B:
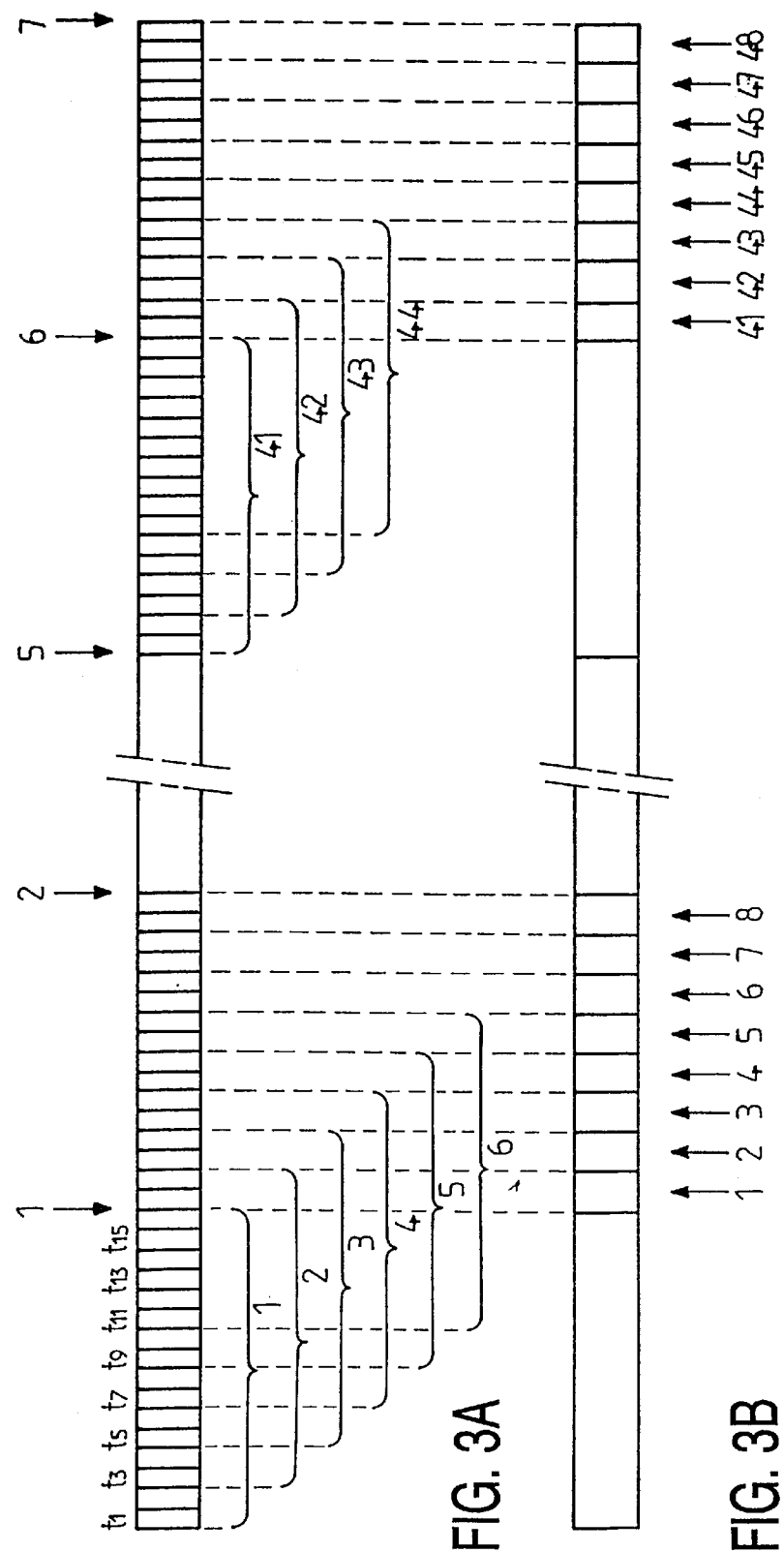
FIG. 3 illustrates the method according to the invention for converting a digital image rate.

The method is illustrated in FIG. 3. In A are represented the original images formed respectively by 16 data frames, displayed on an LCD at the rate of 16 images per second. In B are represented the output images derived with the timing of 48 images per second based on original images.

FIG. 3 illustrates in particular the starting phase of the system. The first average is calculated over the 16 data frames received first, referenced $t_1$ to $t_{16}$ and the result forms the first available image. Then the 14 last ones of these frames previously received are considered, that is to say, the frames $t_3$ to $t_{16}$ and the two following frames $t_{17}$ and $t_{18}$. Then the average of the frames $t_3$ to $t_{18}$ is calculated for assembling the second available image. The frames $t_1$ and $t_2$ are thus lost. All the images are thus assembled. For example, the tenth image comes from the calculation of the average of the frames $t_{19}$ to $t_{25}$, the frames $t_1$ to $t_{18}$ being lost.

Thus, the method according to the invention provides a simple and advantageous means for artificially increasing the output image rate without modifying the structure of the input data or requiring additional data.

In order to limit the number of calculations, an advantageous method is proposed and illustrated by the following Table. Variables Vi are used which contain the data of two consecutive frames. Physically, the variables Vi represent unfinished digital images which, once they have been combined, form a complete image.

| Instant τ | Instant (τ + 1) | Instant (τ + 2) |
| --- | --- | --- |
| V1 | V2 | V3 |
| V2 | V3 | V4 |
| V3 | V4 | V5 |
| V4 | V5 | V6 |
| V5 | V6 | V7 |
| V6 | V7 | V8 |
| V7 | V8 | V9 |
| V8 | V9 | V10 |
| Rτ | R(τ + 1) | R(τ + 2) |

The frames being processed in pairs, the Table presents in a unique manner sums of two successive frames. V1 is the sum of the frames $t_1$ and $t_2$, V2 of the frames $t_3$ and $t_4$, etc. The average of the frames $t_1$ to $t_{16}$ represented in the Table by R(τ) is calculated at the instant τ, that of the frames $t_3$ to $t_{18}$ represented by R(τ+1) is calculated at the instant τ+1 and that of the frames $t_5$ to $t_{20}$ represented by R(τ+2) is calculated at the instant τ+2.

The calculations are made as indicated hereafter. Assuming:

$$R_\tau = \sum_{j=1}^{8} \frac{V_j}{8} = \frac{V_1}{8} + \sum_{j=2}^{8} \frac{V_j}{8}$$

$$R_{(\tau+1)} = \sum_{j=1}^{8} \frac{V_{(j+1)}}{8} = \frac{V_9}{8} + \sum_{j=2}^{8} \frac{V_j}{8}$$

$$R_{(\tau+1)} = \frac{V_2}{8} + \sum_{j=3}^{9} \frac{V_j}{8}$$

$$R_{(\tau+2)} = \sum_{j=1}^{8} \frac{V_{(j+2)}}{8} = \frac{V_{10}}{8} + \sum_{j=3}^{9} \frac{V_j}{8}$$

Assuming $\phi_1 = R_{(\tau+1)} - R_\tau$ $$\phi_1 = \frac{V_9 - V_1}{8}$$

and: $\phi_2 = R_{(\tau+2)} - R_{(\tau+1)}$ $$\phi_2 = \frac{V_{10} - V_2}{8}$$

one has:

$$R_{(\tau+1)} = R_\tau + \phi_1$$

and:

$$R_{(\tau+2)} = R_{(\tau+1)} + \phi_2 = R_\tau + \phi_1 + \phi_2$$

Recurring to i, there will be obtained without much effort:

$$R_{(\tau+i)} = R_\tau + \sum_{k=0}^{i} \phi_k \text{ for any } i \geq 0$$

Supposing that $R_\tau = 0$, then the calculation of the sliding average becomes for any $i \geq 0$ $$R_{(\tau+i)} = \sum_{k=0}^{i} \phi_k$$

For starting the system, the variable $R\tau$ is set to zero. The method intends to optimize the frequency of the calculations to facilitate its use with the aid of average capacity microprocessors.

Figure 4:
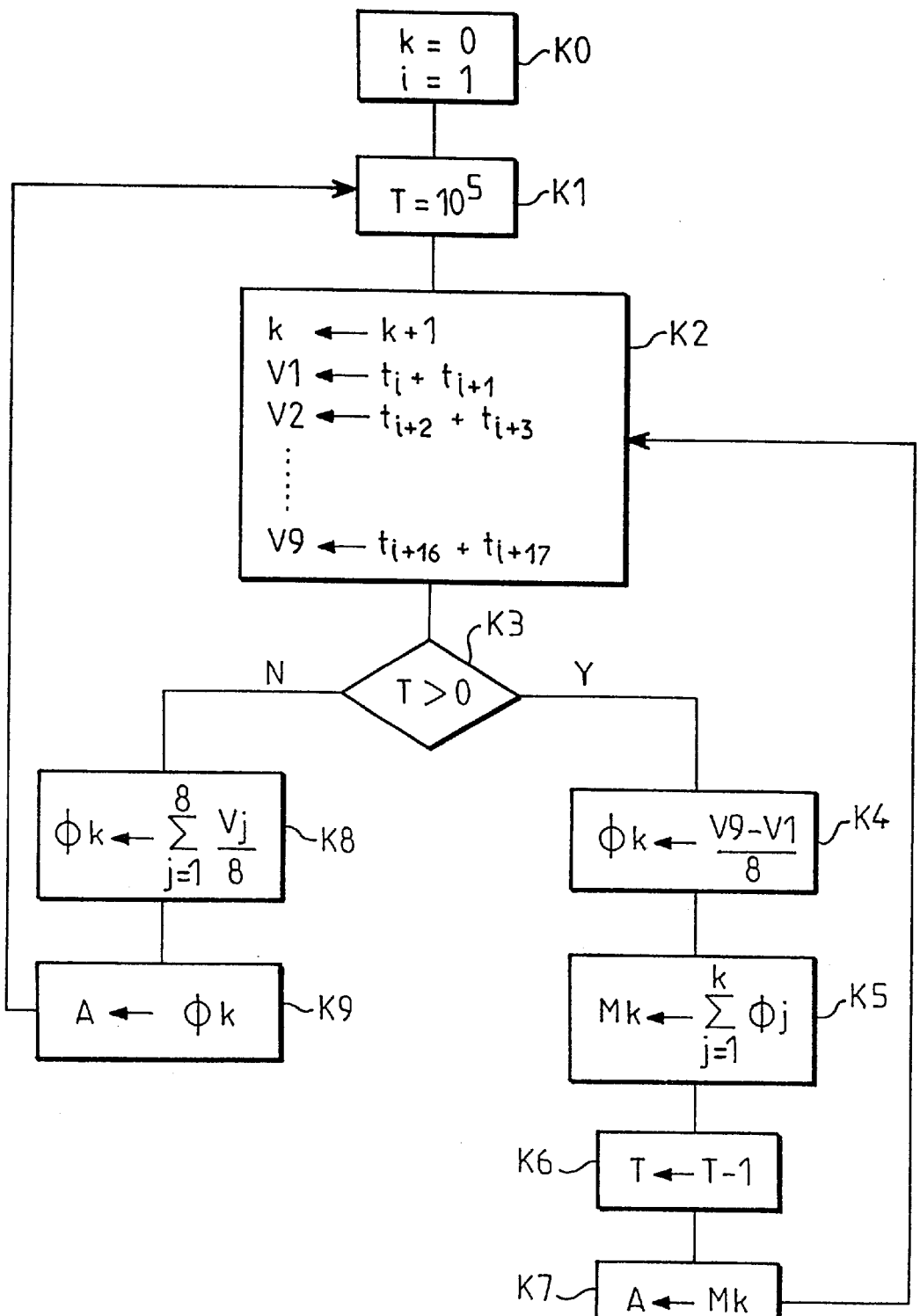
FIG. 4 represents a flow chart illustrating an embodiment of the rate converting method according to the invention.

The flow chart of FIG. 4 breaks down the various steps of the method (K0 to K9). This may be advantageously implanted in systems controlled by a computer, or in integrated electronic circuits to be used in small-size devices.

A first preliminary step of the method (KO) consists of setting an iteration index k to zero and a variable i to 1 utilized for allocating the received frames. A second preliminary step (K1) sets a time delay variable T to 100000.

A storage step (K2) adds an increment to the index k and stores all the variables V1 to V9, while the sums of consecutive input data frames are taken in pairs, so that each frame $t_i$ to $t_i+17$ is taken into account only one time.

A test step (K3) for testing the sign of the variable T precedes the step for calculating the average (K4 to K8).

If it is strictly positive (Y), the step (K4) for calculating the sliding average of the frames is carried out. The calculation of the sliding average described above is briefly recalled in the flow chart by the instructions K4 and K5. Then unity is subtracted from the variable T (K6). The final result Mk of the calculation of the average is stored under the variable A which represents a digital image intended to be derived with the timing fixed by the output image rate. Then the method is resumed at step K2.

If the variable T is set to zero (N), the conventional calculation of the arithmetical average of the variables V1 to V8 is carried out (K8), which arithmetical average is equivalent to the arithmetical average of the 16 frames $t_i$ to $t_{i+15}$ during the processing. The result $\phi$k (K9) is stored under the variable A derived (as in step K7) with a timing determined by the output image rate to be displayed on a monitor. After that the method is resumed with step K1.

Figure 5:
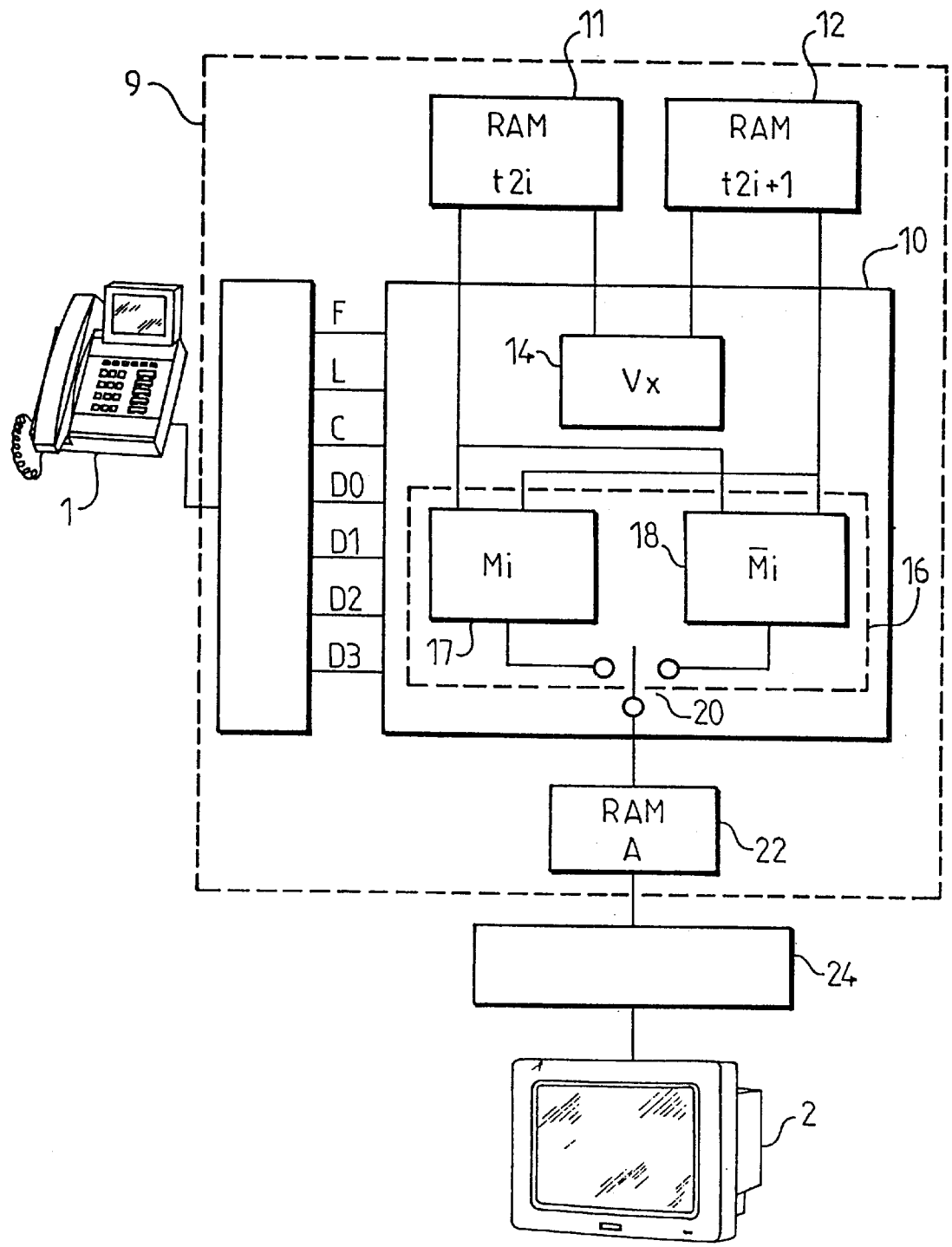
FIG. 5 represents a block circuit diagram of a preferred embodiment for a digital image rate converting device according to the invention.

The preferred embodiment of the invention will now be described with reference to the block circuit diagram represented in FIG. 5. In the rate converting device 9, the calculations are carried out by a programmable logic circuit of the FPGA type (Field Programmable Gate Array). The information representing the data frames originally intended for the LCD are sent to the input of the FPGA through specific ports F, L, C, D0, D1, D2 and D3. F represents the FRAME signal for frame synchronization on the LCD screen which allows the display of each frame on the screen. L represents the LOAD signal for confirming each of the 240 lines of the screen. It is the clock signal CKD that confirms the data D0 to D3 representing the information of 4 adjacent pixels on a line of the screen.

The data frames are stored in random-access memories 11 and 12 RAM. The frames having an even index $t_{2i}$ are stored in the memory 11 and the frames having an odd index $t_{2i+1}$ are stored in the memory 12. A calculation unit 14 calculates the sums of two successive frames, one coming from the memory 11 and the other from the memory 12 to produce the data VX. With a set of cells of the sliding and arithmetical averages respectively, of 8 successive data VX, VX to V(X+7), the set of the data VX to V(X+7) contains the information of 16 consecutive frames. A device 20 actuated because the timing variable T has elapsed indicated in FIG. 4, momentarily selects the calculation cell for calculating the arithmetical average 18, so that the calculation of the arithmetical average on the stored frames is triggered. The object of this operation is to avoid the errors being propagated due to the use of previous calculation results in the calculations of sliding averages. A display memory 22 permits to store the calculated images with the aid of averages derived from the output of the calculation cells 17 and 18. The display interface 24 transmits the stored images to a video format device and displays them on the monitor 2.

As a matter of course, the invention is not restricted to the embodiments which have just been described and represented. Other variants of embodiments of the invention will be evident to a person of ordinary skill in the art, more particularly as regards the calculation methods of the sliding average, because these variants do not leave the scope of the invention.

What is claimed is:

1. A digital signal converting method for converting a series of input images at an input image rate I into a series of output images at an output image rate O=M*I, where M is an integer greater than one, each input image being formed by a series of a fixed number K of input data frames, where K=P*M, K and P being integers greater than one, said method comprising:

storing input data frames either individually or as combinations of C input data frames each, where C is an integer that is less than or equal to P, calculating a sliding average over K stored individual data frames or K/C stored data frame combinations, and successively deriving said averages to produce the output images with a timing fixed by the output image rate O.

2. The method as claimed in claim 1, wherein the calculation of the sliding average is preceded by triggering the calculation of an arithmetical average.

3. A method as claimed in claim 1, wherein K=16 and the input images have a format that is compatible with a liquid crystal display screen.

4. A method as claimed in claim 2, wherein M=8 and the series of output images is transmitted to a display monitor.

5. A digital signal converting device for converting a series of input images at an input image rate I into a series of output images at an output image rate O+M*I, where M is an integer greater than one, each input image being formed by a series of a fixed number K of input data frames, where K=P*M, K and P being integers greater than one, said device comprising:

storage means for storing input data frames either individually or as combinations of C input data frames each, where C is an integer that is greater than one and less than or equal to P, a calculation means for calculating a sliding average over K stored frames or K/C stored data frame combinations, and for successively deriving said averages and for producing the output images with a timing fixed by the output image rate O.

6. The device as claimed in claim 5, wherein the calculation means further comprises a control device for triggering the calculation of the arithmetical average.

7. A device as claimed in claim 5, wherein K=16 and the series of input images is produced by the device for generating images on a liquid crystal display screen.

8. A device as claimed in claim 7, wherein M=8 and the series of output images is transmitted to a display monitor.

* * * * *